US012602218B1

(12) United States Patent
Kiernan et al.

(10) Patent No.: US 12,602,218 B1
(45) Date of Patent: Apr. 14, 2026

(54) APPARATUS, SYSTEM, AND METHOD FOR SUPPLEMENTING OUTDATED VERSIONS OF OPERATING SYSTEMS TO FACILITATE UPGRADES

(71) Applicant: Juniper Networks, Inc., Sunnyvale, CA (US)

(72) Inventors: Stephen J. Kiernan, Sunnyvale, CA (US); Simon J. Gerraty, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 154 days.

(21) Appl. No.: 18/169,373

(22) Filed: Feb. 15, 2023

(51) Int. Cl.
  G06F 9/44 (2018.01)
  G06F 8/65 (2018.01)
(52) U.S. Cl.
  CPC ...................................... G06F 8/65 (2013.01)
(58) Field of Classification Search
  CPC ......................................................... G06F 8/65
  USPC ........................................................ 717/169
  See application file for complete search history.

(56) References Cited

U.S. PATENT DOCUMENTS

| | | | | |
|---|---|---|---|---|
| 6,763,518 | B2 * | 7/2004 | Hart ........................ | G06F 9/544 |
| | | | | 718/1 |
| 8,387,048 | B1 * | 2/2013 | Grechishkin ........... | G06F 9/445 |
| | | | | 718/1 |
| 8,887,182 | B2 * | 11/2014 | Low ........................ | G06F 9/541 |
| | | | | 719/330 |
| 9,665,355 | B2 * | 5/2017 | Jawa ....................... | H04W 12/02 |
| 9,766,911 | B2 * | 9/2017 | Das ....................... | G06F 9/45504 |
| 10,409,625 | B1 * | 9/2019 | Suryanarayanan ..... | G06F 8/656 |
| 10,936,296 | B2 * | 3/2021 | Mitra ........................ | G06F 8/65 |
| 11,194,563 | B1 * | 12/2021 | Steigleder ............... | G06F 16/00 |
| 2011/0225577 | A1 * | 9/2011 | Wookey ................... | G06F 8/658 |
| | | | | 717/175 |

FOREIGN PATENT DOCUMENTS

| | | | | | |
|---|---|---|---|---|---|
| WO | WO-2012082936 | A2 * | 6/2012 | ........... | G06F 21/125 |

\* cited by examiner

*Primary Examiner* — Evral E Bodden

(74) *Attorney, Agent, or Firm* — Greenberg Traurig, LLP

(57) ABSTRACT

A disclosed apparatus may include and/or represent (1) at least one storage device configured to store a version of an OS that supports a plurality of intrinsic system calls and (2) at least one processing device communicatively coupled to the storage device. In this example, the processing device may be configured to (A) detect an incoming package that facilitates upgrading at least one component associated with the OS, (B) determine, based at least in part on the incoming package, that the component is compatible with a different version of the OS, and/or (C) supplement the version of the OS to support, in addition to the plurality of intrinsic system calls, at least one extrinsic system call available in the different version of the OS. Various other apparatuses, systems, and methods are also disclosed.

20 Claims, 8 Drawing Sheets

System
200

Computing Device
100

Storage Device
102

Component
112

Operating System
106

Table
306

Intrinsic System Call
108(1)

•
•
•

Intrinsic System Call
108(N)

Table
308

Extrinsic System Call
114(1)

•
•
•

Extrinsic System Call
114(N)

Processing Device
104

Computing Device
100

Storage Device
102

Component
112

Operating System
106

Table
306

Intrinsic System Call
108(1)

•
•
•

Intrinsic System Call
108(N)

Extrinsic System Call
114(1)

•
•
•

Extrinsic System Call
114(N)

Processing Device
104

Computing Device
100
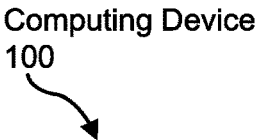
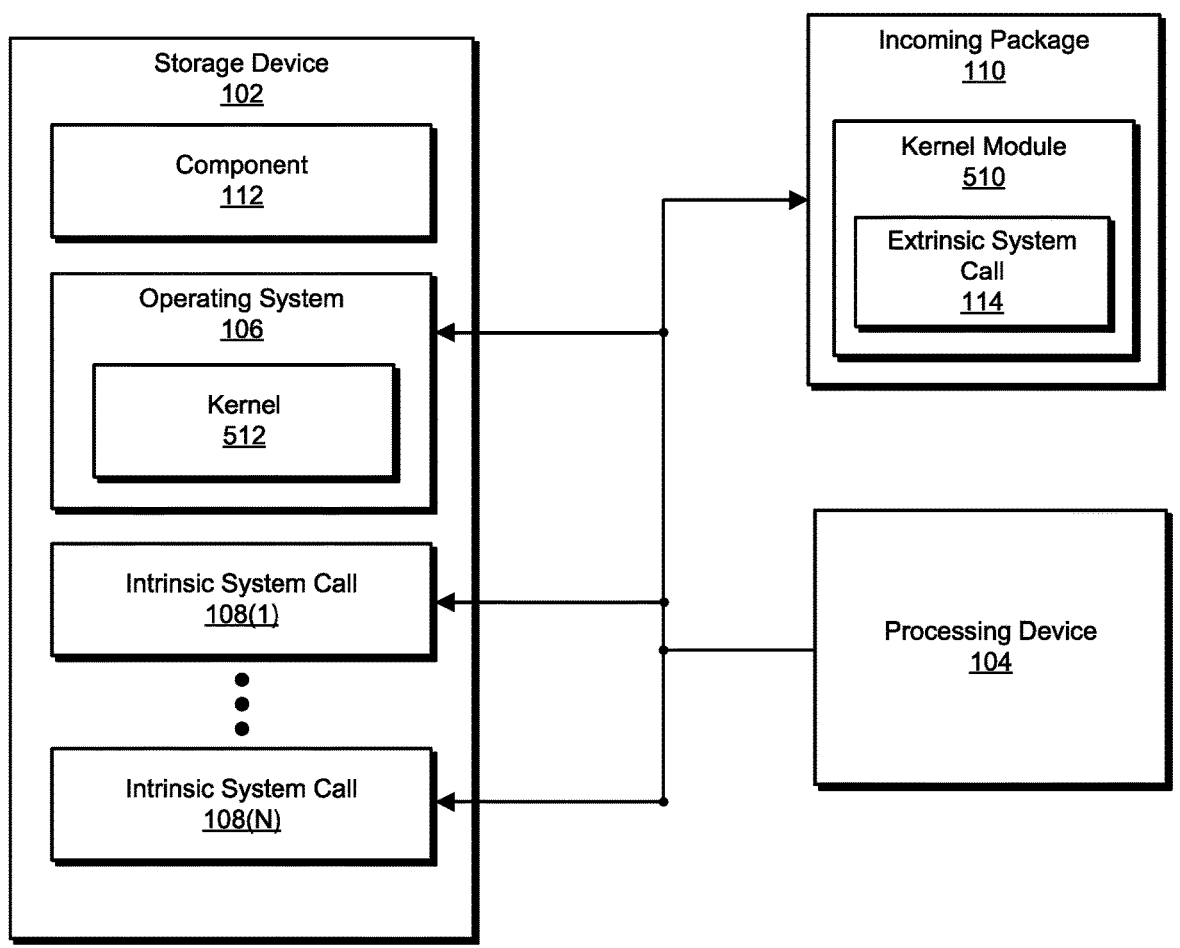
*FIG. 5*

Figure 6:
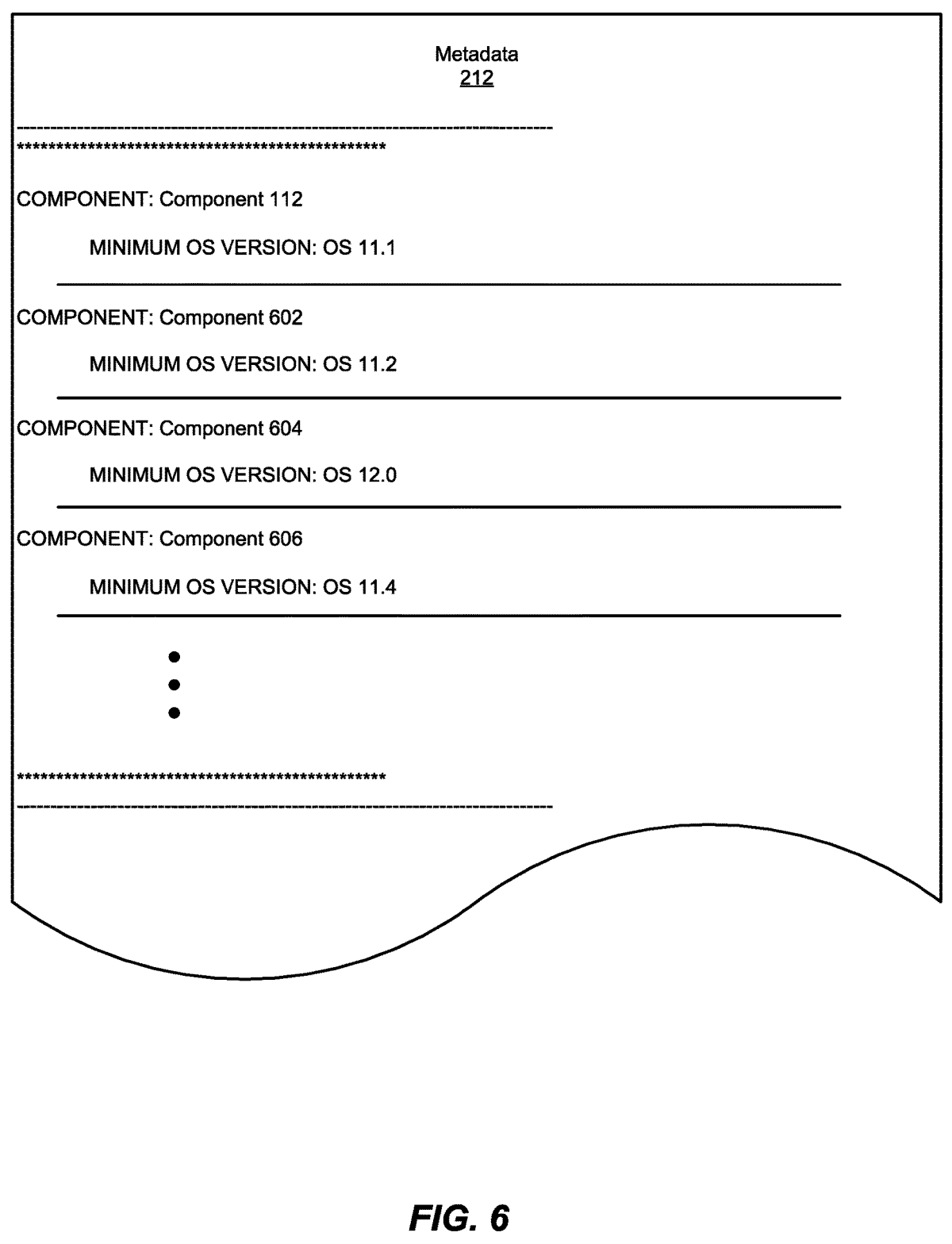

Metadata
212

---------------------------------------------------------------------

**************************************************

COMPONENT: Component 112

MINIMUM OS VERSION: OS 11.1
_____

COMPONENT: Component 602

MINIMUM OS VERSION: OS 11.2
_____

COMPONENT: Component 604

MINIMUM OS VERSION: OS 12.0
_____

COMPONENT: Component 606

MINIMUM OS VERSION: OS 11.4
_____

Method
700

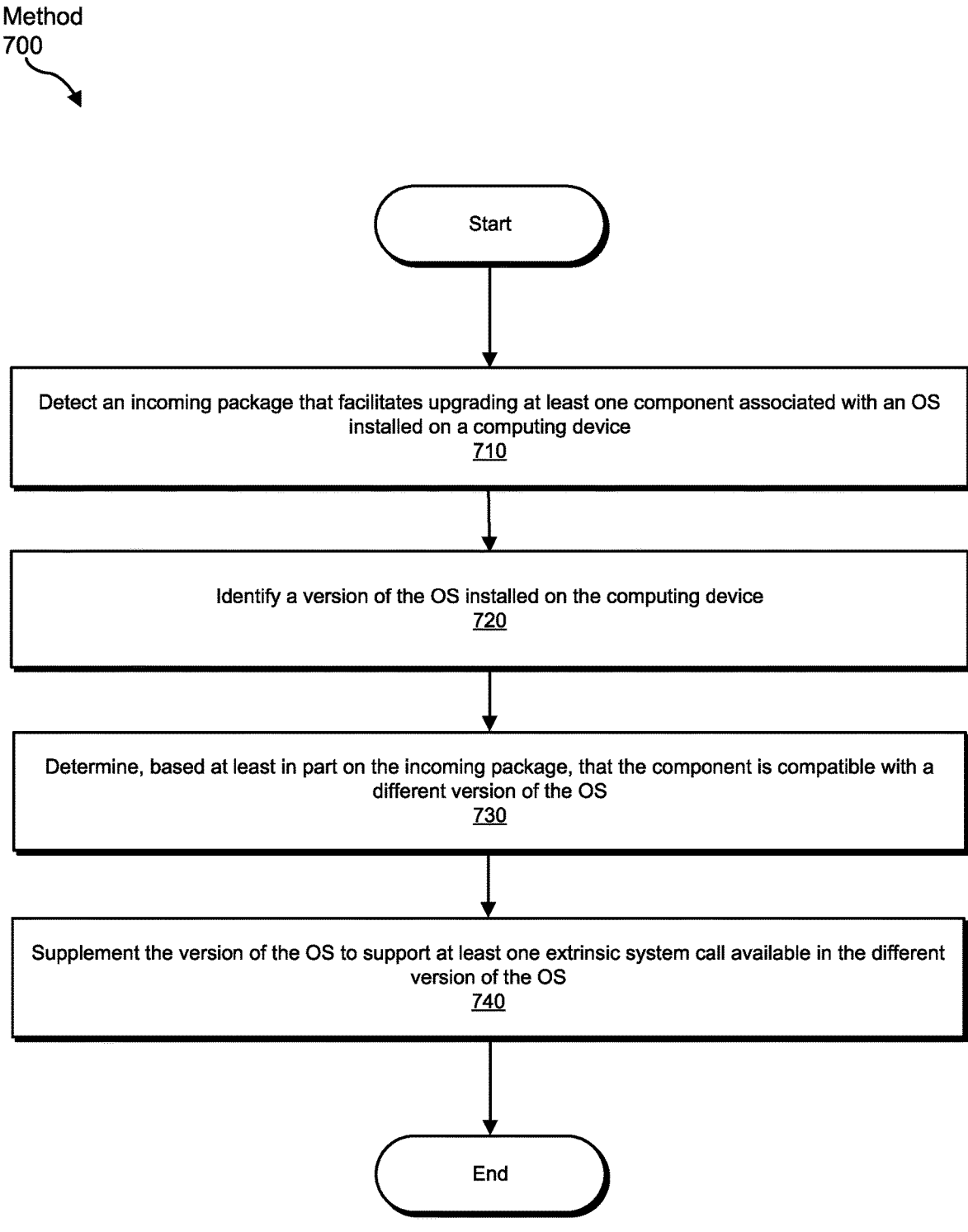

Start

Detect an incoming package that facilitates upgrading at least one component associated with an OS installed on a computing device
710

Identify a version of the OS installed on the computing device
720

Determine, based at least in part on the incoming package, that the component is compatible with a different version of the OS
730

Supplement the version of the OS to support at least one extrinsic system call available in the different version of the OS
740

End

*FIG. 7*

APPARATUS, SYSTEM, AND METHOD FOR SUPPLEMENTING OUTDATED VERSIONS OF OPERATING SYSTEMS TO FACILITATE UPGRADES

BACKGROUND

Computing devices often implement software components that receive occasional upgrades. In some examples, an upgrade to a software component may be compiled for execution by a certain version of an operating system (OS). Accordingly, if a computing device runs an earlier version of the OS, the upgrade to the software component may be incompatible with the earlier version of the OS. As a result, that computing device may be unable to successfully complete the upgrade to the software component until the earlier version of the OS is replaced with the appropriate version.

In some examples, a user of a computing device may avoid upgrading its OS to the newest version for several reasons (e.g., concerns about interruptions, downtime, corruption, software bugs, reboots, etc.). In such examples, the computing device running the outdated version of the OS may be unable to upgrade other software components (e.g., user-space applications) due to the version of the OS being outdated. The instant disclosure, therefore, identifies and addresses a need for additional apparatuses, systems, and methods for supplementing outdated versions of OSes to facilitate upgrades to other software components.

SUMMARY

As will be described in greater detail below, the instant disclosure generally relates to apparatuses, systems, and methods for supplementing outdated versions of OSes to facilitate upgrades. In one example, an apparatus for accomplishing such a task may include and/or represent (1) at least one storage device configured to store a version of an OS that supports a plurality of intrinsic system calls and (2) at least one processing device communicatively coupled to the storage device. In this example, the processing device may be configured to (A) detect an incoming package that facilitates upgrading at least one component associated with the OS, (B) determine, based at least in part on the incoming package, that the component is compatible with a different version of the OS, and/or (C) supplement the version of the OS to support, in addition to the plurality of intrinsic system calls, at least one extrinsic system call available in the different version of the OS.

Similarly, a corresponding method may include and/or represent (1) detecting an incoming package that facilitates upgrading at least one component associated with an OS installed on a computing device, (2) identifying a version of the OS installed on the computing device, (3) determining, based at least in part on the incoming package, that the component is compatible with a different version of the OS, and then in response to determining that the component is compatible with the different version of the OS, (4) supplementing the version of the OS to support at least one extrinsic system call available in the different version of the OS.

Additionally or alternatively, a corresponding non-transitory computer-readable medium may include and/or represent one or more computer-executable instructions. In one example, when executed by at least one processing device, the computer-executable instructions may cause the processing device to (1) detect an incoming package that facilitates upgrading at least one component associated with an OS installed on a computing device, (2) identify a version of the OS installed on the computing device, (3) determine, based at least in part on the incoming package, that the component is compatible with a different version of the OS, and (4) supplement the version of the OS to support at least one extrinsic system call available in the different version of the OS in response to determining that the component is compatible with the different version of the OS.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 5 is a block diagram of an exemplary computing device capable of supplementing an outdated version of an OS to facilitate upgrades according to one or more embodiments of this disclosure.

FIG. 6 is an illustration of exemplary metadata that identifies which versions of an OS correspond to certain components included in an incoming package according to one or more embodiments of this disclosure.

FIG. 7 is a flow diagram of an exemplary method for supplementing outdated versions of OSes to facilitate upgrades according to one or more embodiments of this disclosure.

Figure 1:
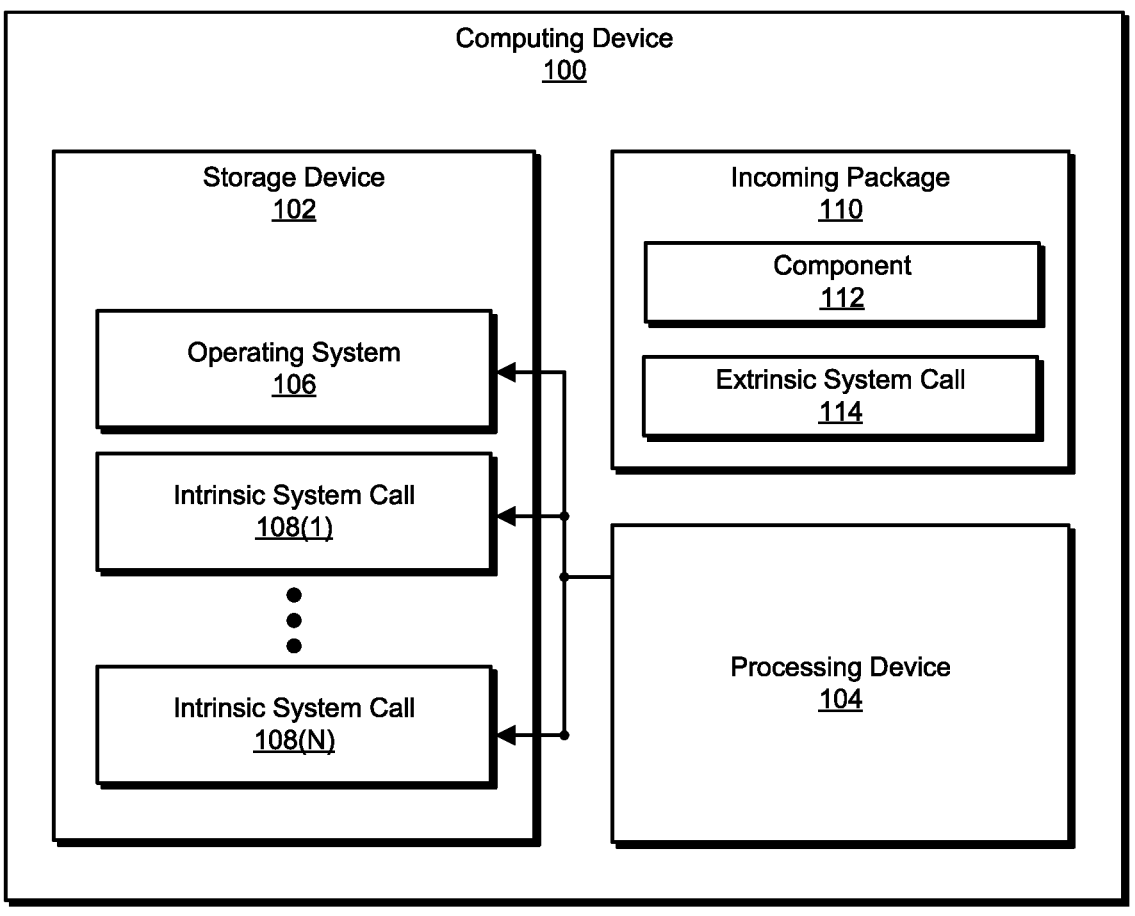
FIG. 1 is a block diagram of an exemplary computing device capable of supplementing an outdated version of an OS to facilitate upgrades according to one or more embodiments of this disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY
EMBODIMENTS

The present disclosure describes various apparatuses, systems, and methods for supplementing outdated versions of OSes to facilitate upgrades. As will be explained in greater detail below, embodiments of the instant disclosure may involve a network device (such as a router and/or switch) that receives and/or detects an incoming upgrade package that facilitates upgrading one or more software components associated with the OS. In some examples, the network device may inspect, analyze, and/or examine the upgrade package to determine whether the software components are compatible with the version of the OS installed and/or running on the network device. For example, the network device may search the upgrade package for metadata associated with the software components. During this search, the network device may find and/or identify metadata indicating that the software components need, require, and/or call for a newer version of the OS than the one installed and/or running on the network device.

In a conventional situation, the network device may be forced to install and/or run the newer version of the OS before completing the upgrade to these software components or, alternatively, continue operating without the upgrade. However, embodiments of the instant disclosure may enable the network device to complete the upgrade to these software components without necessarily installing or running the newer version of the OS. For example, instead of installing and/or running the newer version of the OS, the network device may supplement and/or enhance the outdated version of the OS to support additional system calls that are not natively implemented and/or utilized by the outdated version of the OS. These additional non-native system calls may provide the outdated version of the OS with the functionality necessary to successfully upgrade and/or execute the software components introduced by the upgrade package, thereby effectively obviating the need to install and/or run the newer version of the OS beforehand. Accordingly, embodiments of the instant disclosure may enable users who avoid OS upgrades to complete separate upgrades to software components associated with the OS.

The following will provide, with reference to FIGS. 1-6 detailed descriptions of exemplary apparatuses, systems, components, and corresponding implementations for supplementing outdated versions of OSes to facilitate upgrades. Detailed descriptions of computer-implemented methods for supplementing outdated versions of OSes to facilitate upgrades will be provided in connection with FIG. 7. In addition, detailed descriptions of an exemplary computing system for carrying out these methods will be provided in connection with FIG. 8.

FIG. 1 illustrates an exemplary computing device 100 for supplementing outdated versions of OSes to facilitate upgrades. In some examples, computing device 100 may constitute and/or represent an apparatus capable of supplying outdated versions of OSes with the functionality necessary to successfully upgrade and/or execute software components. As illustrated in FIG. 1, exemplary computing device 100 may include and/or represent a storage device 102, a processing device 104, and/or an incoming package 110. In some examples, storage device 102 may store, facilitate, and/or support an OS 106 and/or one or more intrinsic system calls 108(1)-(N). In one example, OS 106 may include and/or represent a specific version, release, and/or build of an operating system that supports and/or utilizes intrinsic system calls 108(1)-(N).

In some examples, computing device 100 may include and/or represent one or more hardware, firmware, and/or software components or features that are not necessarily illustrated and/or labeled in FIG. 1. For example, computing device 100 may also include and/or represent communication ports, buses, additional analog and/or digital circuitry, onboard logic, radio-frequency (RF) transmitters, RF receivers, transceivers, antennas, transistors, resistors, capacitors, diodes, inductors, switches, registers, flipflops, connections, traces, buses, semiconductor (e.g., silicon) devices and/or structures, additional processing devices, additional storage devices, circuit boards, sensors, packages, substrates, housings, combinations or variations of one or more of the same, and/or any other suitable components or features that facilitate and/or support supplementing outdated versions of OSes to facilitate upgrades.

In some examples, computing device 100 may include and/or represent one or more firmware and/or software modules for performing one or more tasks in connection supplementing outdated versions of OSes to facilitate upgrades. In one example, one or more of these modules may include and/or represent one or more software applications or programs that, when executed by processing device 104, cause and/or direct processing device 104 to perform one or more tasks. Additionally or alternatively, one or more of these modules may also include and/or represent some or all of an executable file, a code snippet, and/or a computer-readable instruction used to program and/or configure processing device 104.

In some examples, storage device 102 may include and/or represent any type or form of volatile or non-volatile memory device, medium, and/or system capable of storing data and/or computer-readable instructions. In one example, storage device 102 may store, load, and/or maintain OS 106, intrinsic system calls 108(1)-(N), and/or one or more modules. Although illustrated as a single unit in FIG. 1, storage device 102 may alternatively include and/or represent a distributed storage system consisting of multiple memory units. Examples of storage device 102 include, without limitation, random access memory (RAM), read only memory (ROM), flash memory, hard disk drives, (HDDs), solid-state drives (SSDs), optical disk drives, caches, variations or combinations of one or more of the same, and/or any other suitable storage memory devices.

In some examples, processing device 104 may include and/or represent any type or form of hardware-implemented processing unit capable of interpreting and/or executing computer-readable instructions. In one example, processing device 104 may access, modify, and/or execute OS 106, intrinsic system calls 108(1)-(N), and/or one or more modules stored in storage device 102. Additionally or alternatively, processing device 104 may launch, perform, and/or execute certain executable files, code snippets, and/or computer-readable instructions to supplement and/or enhance outdated versions of OSes to facilitate upgrades. Although illustrated as a single unit in FIG. 1, processing device 104 may include and/or represent a collection of multiple processing units that work and/or operate in conjunction with one another. Examples of processing device 104 include, without limitation, microprocessors, microcontrollers, central processing units (CPUs), field-programmable gate arrays (FPGAs), application-specific integrated circuits (ASICs), systems on chips (SoCs), parallel accelerated processors, tensor cores, integrated circuits, chiplets, portions of one or more of the same, variations or combinations of one or more of the same, and/or any other suitable processing devices.

In some examples, OS 106 may include and/or represent a system software that manages hardware and/or software resources on computing device 100 and/or directs interactions between such hardware and software resources. In one example, OS 106 may include and/or represent a kernel that controls, facilitates, and/or supports access by applications to hardware devices and/or features on computing device 100. Virtual memory in storage device 102 may be segregated and/or divided into user space where application software is stored and kernel space where OS 106 is stored. In certain implementations, OS 106 may include and/or represent a network OS configured, intended, and/or designed for a network device (such as a router and/or switch).

In some examples, intrinsic system calls 108(1)-(N) may include and/or represent any type or form of process, interface, and/or syntax used by applications to request services and/or features from OS 106. In one example, intrinsic system calls 108(1)-(N) may be natively, intrinsically, and/or innately supported, implemented, or utilized by the version of OS 106 installed and/or running on computing device 100. For example, when that version of OS 106 is installed on computing device 100, that version of OS 106 may support, implement, and/or utilize intrinsic system calls 108(1)-(N) at the time of the install. Although illustrated as separate and/or distinct from OS 106 in FIG. 1, intrinsic system calls 108(1)-(N) may each constitute and/or represent part of and/or a component integrated into OS 106. In certain examples, intrinsic system calls 108(1)-(N) may be stored, arranged, and/or organized in a table (e.g., a system call table) and/or an index.

In some examples, the terms "intrinsic" and "extrinsic" may be used to distinguish certain system calls from one another. In one example, the terms "intrinsic" and "extrinsic" may be used to express relativity in connection with such system calls. For example, a first version of OS 106 may support, implement, and/or utilize a first set of system calls, and a second version of OS 106 may support, implement, and/or utilize a second set of system calls extrinsic and/or outside the first set of system calls. In this example, the first set of system calls may be intrinsic to the first version of OS 106, but the second set of system calls may be extrinsic to the first version of OS 106.

In some examples, the first and second versions of OS 106 may support, implement, and/or utilize one or more of the same system calls. Accordingly, all these system calls that are common to both first and second versions of OS 106 may be intrinsic to both first and second versions of OS 106. However, the second version of OS 106 may also support, implement, and/or utilize one or more system calls that are not natively supported, implemented, and/or utilized by the first version of OS 106. In this example, those system calls that are not natively supported, implemented, and/or utilized by the first version of OS 106 may be extrinsic to the first version of OS 106.

In some examples, incoming package 110 may facilitate and/or support upgrading and/or updating one or more software components (e.g., a component 112 in FIG. 1) associated with OS 106. In one example, one or more of these components may include and/or represent a software feature and/or module of OS 106. Additionally or alternatively, one or more of these components may include and/or represent a software feature and/or module of an application or program managed and/or serviced by OS 106. In certain implementations, one or more of these components may include and/or represent software features that existed on and/or were implemented by computing device 100 before the arrival of incoming package 110. In other implementations, one or more of these components may include and/or represent software features that are added to and/or implemented by computing device 100 for the first time as a result of incoming package 110.

In some examples, incoming package 110 may include and/or represent component 112 and/or one or more extrinsic system calls (e.g., an extrinsic system call 114 in FIG. 1) that are available in one or more different versions of OS 106 than the one installed and/or running on computing device 100. In such examples, extrinsic system call 114 may include and/or represent a system call that was not natively supported, implemented, and/or utilized by the version of OS 106 installed and/or running on computing device 100.

In some examples, computing device 100 may include and/or represent any type or form of physical device and/or system capable of reading computer-executable instructions, handling network traffic, and/or supplementing outdated versions of OSes to facilitate upgrades. In one example, computing device 100 may include and/or represent a network device that facilitates and/or supports the flow of traffic within a network and/or across networks. Additional examples of computing device 100 include, without limitation, routers (such as a transit label switching router, a label edge router, a provider edge router, a hub router, a spoke router, an autonomous system boundary router, and/or an area border router), switches, hubs, modems, bridges, repeaters, gateways (such as broadband network gateways), multiplexers, network adapters, network interfaces, linecards, collectors, client devices, laptops, tablets, desktops, servers, cellular phones, personal digital assistants (PDAs), multimedia players, embedded systems, wearable devices, gaming consoles, portions of one or more of the same, variations or combinations of one or more of the same, and/or any other suitable computing device.

Figure 2:
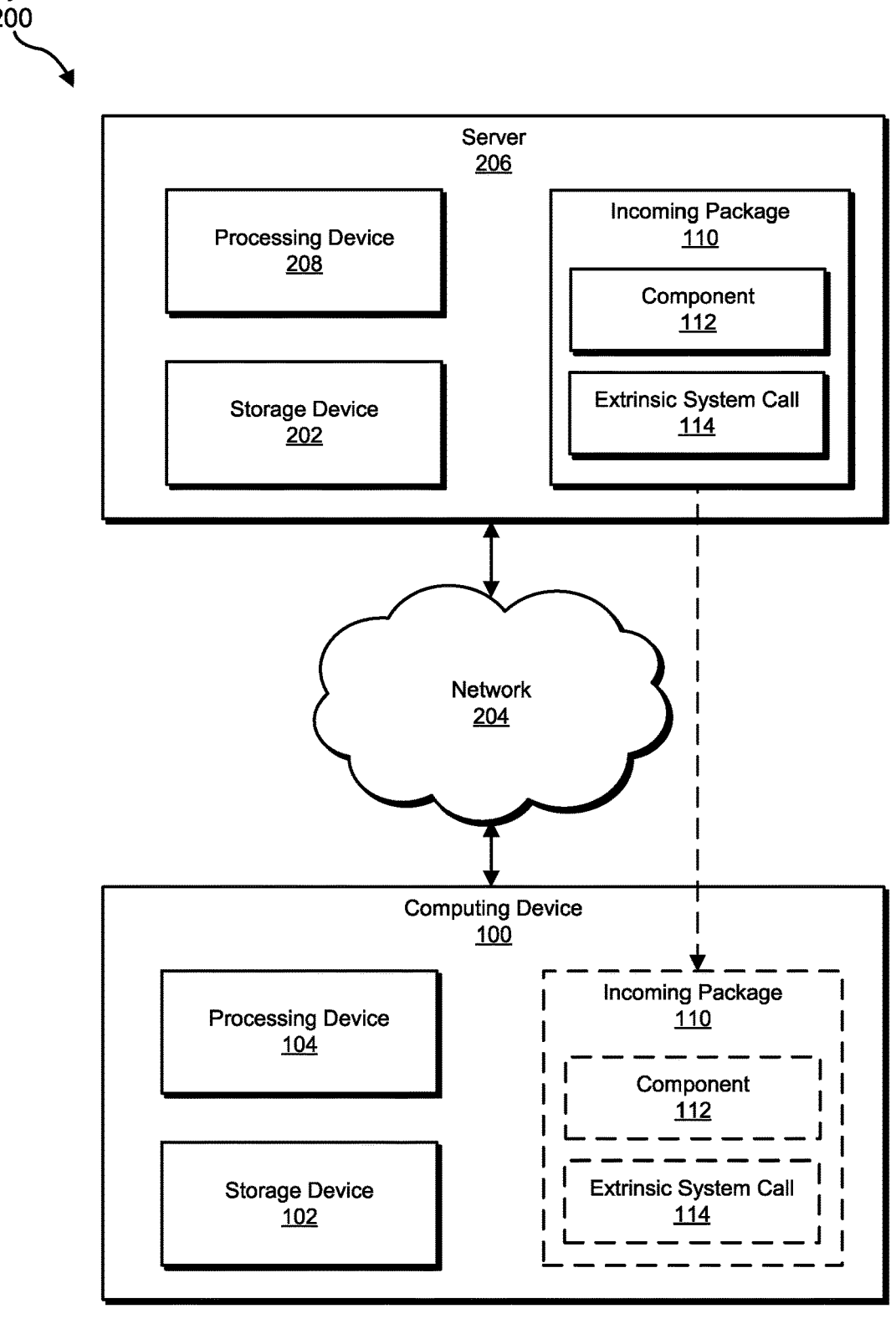
FIG. 2 is a block diagram of an exemplary system for supplementing an outdated version of an OS to facilitate upgrades according to one or more embodiments of this disclosure.

Exemplary computing device 100 in FIG. 1 may be implemented in a variety of ways. For example, all or a portion of exemplary computing device 100 may include and/or represent portions of an exemplary system 200 in FIG. 2. As illustrated in FIG. 2, exemplary system 200 may include and/or represent computing device 100 and server 206 communicatively coupled to one another via a network 204. Although illustrated as being external to network 204 in FIG. 2, computing device 100 and/or server 206 may alternatively represent portions of network 204 and/or be included in network 204.

In some examples, server 206 may include and/or represent a storage device 202, a processing device 208, and/or incoming package 110. Server 206 may include and/or represent any type or form of computing device capable of maintaining, providing, and/or distributing software upgrade packages. In one example, server 206 may include and/or represent a web server that distributes, on an as-needed and/or periodic basis, packages to computing devices undergoing and/or in need of software upgrades. Additional examples of server 206 include, without limitation, security servers, application servers, storage servers, and/or database servers configured to run certain software applications and/or provide various security, storage, and/or database services. Although illustrated as a single entity in FIG. 2, server 206 may include and/or represent a plurality of devices that work and/or operate in conjunction with one another.

In some examples, network 204 may include and/or represent any medium and/or architecture capable of facilitating device-to-device communication, data transfer, and/or software upgrades. In one example, network 204 may facilitate and/or support communications between computing device 100 and server 206. In this example, network 204 may include other devices that are not necessarily illustrated and/or labelled in FIG. 2. Network 204 may facilitate communication or data transfer using wireless and/or wired connections. Examples of network 204 include, without limitation, an intranet, an access network, a layer 2 network, a layer 3 network, an multiprotocol label switching (MPLS) network, an Internet protocol (IP) network, a heterogeneous network (e.g., layer 2, layer 3, IP, and/or MPLS) network, a wide area network (WAN), a local area network (LAN), a personal area network (PAN), the Internet, power line communications (PLC), a cellular network, portions of one or more of the same, variations or combinations of one or more of the same, and/or any other suitable network.

In some examples, server 206 may send, transmit, and/or provide a copy of incoming package 110 to computing device 100 via network 204. In such examples, processing device 104 may receive and/or detect the copy of incoming package 110 upon arrival at computing device 100. In one example, processing device 104 may determine, based at least in part on incoming package 110, that component 112 is compatible with a different version of OS 106 than the one installed and/or running on computing device 100. In this example, processing device 104 may supplement and/or enhance the version of OS 106 installed and/or running on computing device 100 to support extrinsic system call 114 in addition to intrinsic system calls 108(1)-(N).

Upon supplementing and/or enhancing the version of OS 106 installed and/or running on computing device 100 in this way, processing device 104 may upgrade component 112 for computing device 100. In other words, upon supplementing and/or enhancing the version of OS 106 installed and/or running on computing device 100 in this way, processing device 104 may be able to complete the upgrade to component 112 as intended by incoming package 110 despite the version of OS 106 installed and/or running on computing device 100 not yet being upgraded itself. For example, computing device 100 may be equipped with and/or run an older version of an OS kernel, but component 112 may be compiled, configured, and/or programmed for execution by a newer version of that OS kernel. In this example, upon supplementing and/or enhancing the OS to support extrinsic system call 114, processing device 104 may be able to perform the upgrade to component 112 without the newer version of that OS kernel being installed and/or running on computing device 100.

In some examples, processing device 104 may perform and/or implement a configuration-validation procedure before upgrading component 112 to ensure that the supplemented version of OS 106 supports the execution of component 112. Additionally or alternatively, processing device 104 may launch, implement, and/or execute component 112 by leveraging extrinsic system call 114. For example, extrinsic system call 114 may enable the version of OS 106 installed and/or running on computing device 100 to successfully manage and/or service component 112. Put differently, extrinsic system call 114 may enable component 112 to properly communicate with the version of OS 106 installed and/or running on computing device 100 for the purpose of interfacing with hardware resources available on computing device 100.

Processing device 104 may be able to supplement and/or enhance the version of OS 106 installed and/or running on computing device 100 in a variety of different ways and/or contexts. In some examples, a system call table may include and/or be populated with intrinsic system calls 108(1)-(N), and processing device 104 may add and/or introduce a new and/or separate system call table that includes and/or is populated with extrinsic system calls 114(1)-(N). In one example, this new and/or separate system call table may be accessible and/or available on an as-needed basis for component 112 and/or any other relevant components upgraded from incoming package 110. In this example, the new and/or separate system call table may be inaccessible and/or unavailable to some or all of the other components that are unaffected by incoming package 110.

Figure 3:
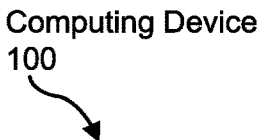
FIG. 3 is a block diagram of an exemplary computing device capable of supplementing an outdated version of an OS to facilitate upgrades according to one or more embodiments of this disclosure.

FIG. 3 illustrates an exemplary implementation of computing device 100 that involves supplementing the version of OS 106 installed and/or running on computing device 100 by adding a new table 308 populated with extrinsic system calls 114(1)-(N) to storage device 102. In some examples, processing device 104 may search incoming package 110 for a kernel module, extrinsic system calls 114(1)-(N), and/or table 308 itself. During this search, processing device 104 may find and/or identify a kernel module, extrinsic system calls 114(1)-(N), and/or table 308 within incoming package 110. Processing device 104 may then apply and/or use the kernel module, extrinsic system calls 114(1)-(N), and/or table 308 to supplement the version of OS 106 installed and/or running on computing device 100.

In some examples, storage device 102 may include and/or represent a table 306 populated with and/or indexed by intrinsic system calls 108(1)-(N). In one example, processing device 104 may copy and/or move table 308 from incoming package 110 to storage device 102. In this example, table 308 may include and/or represent extrinsic system calls 114(1)-(N) for the purpose of supplementing and/or enhancing OS 106 in connection with component 112 and/or any other relevant components upgraded from incoming package 110. In another example, processing device 104 may extract extrinsic system calls 114(1)-(N) from incoming package 110 and create table 308 to accommodate extrinsic system calls 114(1)-(N). In this example, processing device 104 may populate and/or supply table 308 with extrinsic system calls 114(1)-(N) for the purpose of supplementing and/or enhancing OS 106 in connection with component 112 and/or any other relevant components upgraded from incoming package 110.

Figure 4:
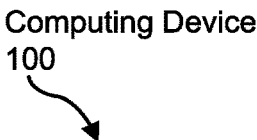
FIG. 4 is a block diagram of an exemplary computing device capable of supplementing an outdated version of an OS to facilitate upgrades according to one or more embodiments of this disclosure.

In a further example, processing device 104 may add and/or introduce extrinsic system calls 114(1)-(N) to an existing system call table that is already populated with intrinsic system calls 108(1)-(N). FIG. 4 illustrates an exemplary implementation of computing device 100 that involves supplementing the version of OS 106 installed and/or running on computing device 100 by adding and/or introducing extrinsic system calls 114(1)-(N) to table 306. For example, processing device 104 may identify and/or locate table 306 populated with intrinsic system calls 108(1)-(N) in storage device 102. In this example, processing device 104 may then patch and/or update table 306 to accommodate and/or incorporate extrinsic system calls 114(1)-(N) based at least in part on incoming package 110.

In an additional example, processing device 104 may apply the kernel module to the kernel of OS 106. FIG. 5 illustrates an exemplary implementation of computing device 100 that involves supplementing the version of OS 106 installed and/or running on computing device 100 by applying a kernel module 510 from incoming package 110 to a kernel 512 of OS 106. In this example, the application of kernel module 510 to kernel 512 may cause extrinsic system call 114 to be added and/or introduced to storage device 102 (e.g., in table 306, table 308, and/or elsewhere). Accordingly, processing device 104 may be able to supplement and/or enhance the version of OS 106 installed and/or running on computing device 100 to support extrinsic system calls in any of these ways.

FIG. 6 illustrates exemplary metadata 212 that identifies and/or indicates which versions of OS 106 are compatible with different components included in and/or affected by incoming package 110. As illustrated in FIG. 6, metadata 212 may include and/or represent information indicating that component 112 is compiled for execution by version 11.1 or higher of OS 106. In some examples, metadata 212 may also include and/or represent information indicating that a component 602 is compiled for execution by version 11.2 or higher of OS 106, a component 604 is compiled for execution by version 12.0 or higher of OS 106, and/or a component 606 is compiled for execution by version 11.4 or higher of OS 106.

In some examples, component 112 may include and/or represent some or all of an executable and linkable format (ELF) binary and/or file. In such examples, metadata 212 may include and/or represent one or more ELF notes associated with component 112, component 602, component 604, and/or component 606. For example, the ELF note associated with component 112 may indicate that component 112 needs at least version 11.1 of OS 106 to run properly.

In some examples, processing device 104 may search incoming package 110 for metadata 212 to identify whether component 112 is compatible with the version of OS 106 installed and/or running on computing device 100. In one example, processing device 104 may find and/or identify metadata 212 during the search. Additionally or alternatively, processing device 104 may find and/or identify additional metadata of OS 106 that indicates the current version installed and/or running on computing device 100. In this example, processing device 104 may compare the minimum version of OS 106 required by component 112 to the current version of OS 106 installed and/or running on computing device 100.

In some examples, processing device 104 may determine and/or discover that component 112 is compatible with a different version (e.g., version 11.1 or higher) of OS 106 based at least in part on this comparison. Additionally or alternatively, processing device 104 may determine and/or discover that component 112 is incompatible with the current version of OS 106 (e.g., any version predating 11.1) installed and/or running on computing device 100 based at least in part on this comparison. Accordingly, if the current version of OS 106 installed and/or running on computing device 100 is older than the minimum version of OS 106 required by component 112, then processing device 104 may determine and/or discover that component 112 is incompatible with the current version of OS 106 installed and/or running on computing device 100. To address and/or resolve this incompatibility, processing device 104 may supplement and/or enhance the current version of OS 106 installed and/or running on computing device 100 to accommodate the needs of component 112 (e.g., by enabling the current version to support extrinsic system call 114).

In some examples, processing device 104 may determine and/or discover that component 112 is compatible with the current version of OS 106 installed and/or running on computing device 100. For example, if the current version of OS 106 installed and/or running on computing device 100 is the same as or newer than the minimum version of OS 106 required by component 112, then processing device 104 may determine and/or discover that component 112 is compatible with the current version of OS 106 installed and/or running on computing device 100. As a result, processing device 104 may be able to perform and/or complete the upgrade to component 112 without modification to the current version of OS 106 installed and/or running on computing device 100.

In some examples, processing device 104 may take certain actions and/or steps to enable extrinsic system call 114 to function properly with the version of OS 106 installed and/or running on computing device 100. For example, processing device 104 may port and/or adapt extrinsic system call 114 from the version of OS 106 for which component 112 was compiled to the version of OS 106 installed and/or running on computing device 100. Additionally or alternatively, processing device 104 may translate and/or convert at least one feature (e.g., codes, services, arguments, results, etc.) from a form compatible with the version of OS 106 for which component 112 was compiled to another form compatible with the version of OS 106 installed and/or running on computing device 100.

FIG. 7 is a flow diagram of an exemplary method 700 for supplementing outdated versions of operating systems to facilitate upgrades. In one example, the steps shown in FIG. 7 may be performed by a computing device that receives an incoming upgrade package. Additionally or alternatively, the steps shown in FIG. 7 may incorporate and/or involve certain sub-steps and/or variations consistent with the descriptions provided above in connection with FIGS. 1-6.

As illustrated in FIG. 7, method 700 may include and/or involve the step of detecting an incoming package that facilitates upgrading at least one component associated with an OS installed on a computing device (710). Step 710 may be performed in a variety of ways, including any of those described above in connection with FIGS. 1-6. For example, a network device (e.g., a router or switch) may receive and/or detect an incoming package. In this example, the incoming package may facilitate and/or be intended for upgrading at least one component associated with an OS installed and/or running on the network device.

Method 700 may also include and/or involve the step of identifying a version of the OS installed on the computing device (720). Step 720 may be performed in a variety of ways, including any of those described above in connection with FIGS. 1-6. For example, the network device may search for metadata of the OS that indicates the current version of the OS in an onboard storage device. In this example, the network device may find and/or identify such metadata during the search. The network device may then identify the current version of the OS based at least in part on such metadata.

Method 700 may further include and/or involve the step of determining that the component is compatible with a different version of the OS based at least in part on the incoming package (730). Step 730 may be performed in a variety of ways, including any of those described above in connection with FIGS. 1-6. For example, the network device may compare the version of the OS for which the component was compiled to the version of the OS installed on the network device.

Method 700 may additionally include and/or involve the step of supplementing the version of the OS to support at least one extrinsic system call available in the different version of the OS in response to the determination (740). Step 740 may be performed in a variety of ways, including any of those described above in connection with FIGS. 1-6. For example, the network device may supplement and/or enhance the version of the OS installed on the network device in response to determining that the component is compatible with a different version of the OS. In this example, the supplementation and/or enhancement may involve enabling the version of the OS installed on the network device to support at least one extrinsic system call available in the different version of the OS.

Figure 8:
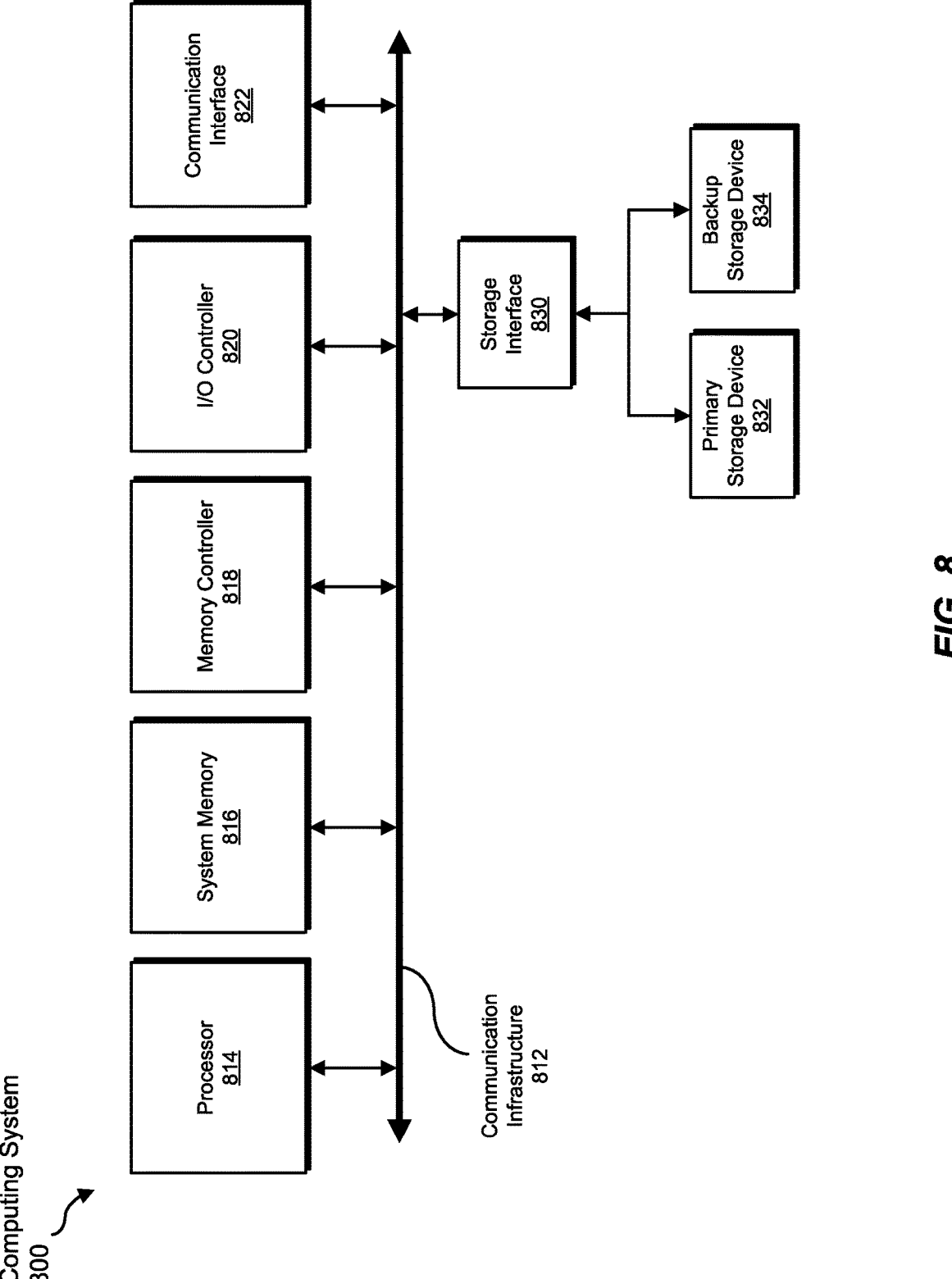
FIG. 8 is a block diagram of an exemplary computing system capable of implementing and/or being used in connection with one or more of the embodiments described in this disclosure.

FIG. 8 is a block diagram of an exemplary computing system 800 capable of implementing and/or being used in connection with one or more of the embodiments described and/or illustrated herein. In some embodiments, all or a portion of computing system 800 may perform and/or be a means for performing, either alone or in combination with other elements, one or more of the steps described in connection with FIG. 3. All or a portion of computing system 800 may also perform and/or be a means for performing and/or implementing any other steps, methods, or processes described and/or illustrated herein.

Computing system 800 broadly represents any type or form of electrical load, including a single or multi-processor computing device or system capable of executing computer-readable instructions. Examples of computing system 800 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 800 may be programmed, configured, and/or otherwise designed to comply with one or more networking protocols. According to certain embodiments, computing system 800 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 800 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 800 may include various network and/or computing components. For example, computing system 800 may include at least one processor 814 and a system memory 816. Processor 814 generally represents any type or form of processing unit capable of processing data or interpreting and executing instructions. For example, processor 814 may represent an ASIC, a system on a chip (e.g., a network processor), a hardware accelerator, a general purpose processor, and/or any other suitable processing element.

Processor 814 may process data according to one or more of the networking protocols discussed above. For example, processor 814 may execute or implement a portion of a protocol stack, may process packets, may perform memory operations (e.g., queuing packets for later processing), may execute end-user applications, and/or may perform any other processing tasks.

System memory 816 generally represents any type or form of volatile or non-volatile storage device or medium capable of storing data and/or other computer-readable instructions. Examples of system memory 816 include, without limitation, Random Access Memory (RAM), Read Only Memory (ROM), flash memory, or any other suitable memory device. Although not required, in certain embodiments computing system 800 may include both a volatile memory unit (such as, for example, system memory 816) and a non-volatile storage device (such as, for example, primary storage device 832, as described in detail below). System memory 816 may be implemented as shared memory and/or distributed memory in a network device. Furthermore, system memory 816 may store packets and/or other information used in networking operations.

In certain embodiments, exemplary computing system 800 may also include one or more components or elements in addition to processor 814 and system memory 816. For example, as illustrated in FIG. 8, computing system 800 may include a memory controller 818, an Input/Output (I/O) controller 820, and a communication interface 822, each of which may be interconnected via communication infrastructure 812. Communication infrastructure 812 generally represents any type or form of infrastructure capable of facilitating communication between one or more components of a computing device. Examples of communication infrastructure 812 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 818 generally represents any type or form of device capable of handling memory or data or controlling communication between one or more components of computing system 800. For example, in certain embodiments memory controller 818 may control communication between processor 814, system memory 816, and I/O controller 820 via communication infrastructure 812. In some embodiments, memory controller 818 may include a Direct Memory Access (DMA) unit that may transfer data (e.g., packets) to or from a link adapter.

I/O controller 820 generally represents any type or form of device or module capable of coordinating and/or controlling the input and output functions of a computing device. For example, in certain embodiments I/O controller 820 may control or facilitate transfer of data between one or more elements of computing system 800, such as processor 814, system memory 816, communication interface 822, and storage interface 830.

Communication interface 822 broadly represents any type or form of communication device or adapter capable of facilitating communication between exemplary computing system 800 and one or more additional devices. For example, in certain embodiments communication interface 822 may facilitate communication between computing system 800 and a private or public network including additional computing systems. Examples of communication interface 822 include, without limitation, a link adapter, a wired network interface (such as a network interface card), a wireless network interface (such as a wireless network interface card), and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 822 may also represent a host adapter configured to facilitate communication between computing system 800 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 822 may also enable computing system 800 to engage in distributed or remote computing. For example, communication interface 822 may receive instructions from a remote device or send instructions to a remote device for execution.

As illustrated in FIG. 8, exemplary computing system 800 may also include a primary storage device 832 and/or a backup storage device 834 coupled to communication infrastructure 812 via a storage interface 830. Storage devices 832 and 834 generally represent any type or form of storage device or medium capable of storing data and/or other computer-readable instructions. For example, storage devices 832 and 834 may represent a magnetic disk drive (e.g., a so-called hard drive), a solid state drive, a floppy disk drive, a magnetic tape drive, an optical disk drive, a flash drive, or the like. Storage interface 830 generally represents any type or form of interface or device for transferring data between storage devices 832 and 834 and other components of computing system 800.

In certain embodiments, storage devices 832 and 834 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 834 may also include other similar structures or devices for allowing computer software, data, or other computer-readable instructions to be loaded into computing system 800. For example, storage devices 832 and 834 may be configured to read and write software, data, or other computer-readable information. Storage devices 832 and 834 may be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from those shown in FIG. 8. Computing system 800 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of network device 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An apparatus comprising:
at least one storage device configured to store a version of an operating system (OS) that supports a plurality of intrinsic system calls accommodated in a table in kernel space; and
at least one processing device communicatively coupled to the storage device and configured to:
    detect an incoming package that facilitates upgrading at least one component associated with the OS;
    identify the component as being compatible with a different version of the OS based at least in part on the incoming package;
    supplement the version of the OS to support, in addition to the plurality of intrinsic system calls, at least one extrinsic system call available in the different version of the OS by:
        allocating, in the kernel space, an extrinsic system call table that accommodates the extrinsic system call and is isolated from the table; or
        patching, in the kernel space, the table to accommodate the extrinsic system call in addition to the plurality of intrinsic system calls; and
    upgrade the component upon supplementing the version of the OS to support the extrinsic system call.

2. The apparatus of claim 1, wherein the processing device is further configured to perform a configuration-validation procedure before upgrading the component to ensure that the supplemented version of the OS supports execution of the upgraded component.

3. The apparatus of claim 1, wherein the processing device is further configured to execute the component by leveraging the extrinsic system call.

4. The apparatus of claim 1, wherein the processing device is further configured to:
patch the table to accommodate the extrinsic system call based at least in part on the incoming package.

5. The apparatus of claim 1, wherein the extrinsic system call table enables the supplemented version of the OS to support execution of the upgraded component.

6. The apparatus of claim 1, wherein:
the different version of the OS is released after the version of the OS; and
the processing device is further configured to:
    search the incoming package for metadata associated with the component; and
    determine, based at least in part on the metadata, that the component is compiled for execution by the different version of the OS.

7. The apparatus of claim 1, wherein the processing device is further configured to determine, based at least in part on the incoming package, that the component is incompatible with the version of the OS.

8. The apparatus of claim 1, wherein the processing device is further configured to:
identify, within the incoming package, a kernel module equipped with the extrinsic system call; and
apply the kernel module to a kernel of the version of the OS to accomplish supplementing the version of the OS.

9. The apparatus of claim 1, wherein the processing device is further configured to port the extrinsic system call from the different version of the OS to the version of the OS.

10. The apparatus of claim 9, wherein the processing device is further configured to translate at least one feature of the extrinsic system call from a form compatible with the different version of the OS to another form compatible with the version of the OS.

11. A method comprising:
detecting an incoming package that facilitates upgrading at least one component associated with an operating system (OS) that is installed on a computing device and supports a plurality of intrinsic system calls accommodated in a table in kernel space;
identifying a version of the OS installed on the computing device;
identifying the component as being compatible with a different version of the OS based at least in part on the incoming package;
in response to determining that the component is compatible with the different version of the OS, supplementing the version of the OS to support at least one extrinsic system call available in the different version of the OS by:
    allocating, in the kernel space, an extrinsic system call table that accommodates the extrinsic system call and is isolated from the table; or
    patching, in the kernel space, the table to accommodate the extrinsic system call in addition to the plurality of intrinsic system calls; and
upgrading the component upon supplementing the version of the OS to support the extrinsic system call.

12. The method of claim 11, wherein:
the version of the OS natively supports a plurality of intrinsic system calls; and
supplementing the version of the OS comprises porting the extrinsic system call from the different version of the OS to the version of the OS such that the version of the OS is able to support the extrinsic system call in addition to the plurality of intrinsic system calls.

13. The method of claim 12, wherein porting the extrinsic system call to the version of the OS comprises translating at least one feature of the extrinsic system call from a form compatible with the different version of the OS to another form compatible with the version of the OS.

14. The method of claim 11, further comprising upgrading the component upon supplementing the version of the OS to support the extrinsic system call.

15. The method of claim 14, further comprising performing a configuration-validation procedure before upgrading the component to ensure that the supplemented version of the OS supports execution of the upgraded component.

16. The method of claim 14, wherein upgrading the component comprises executing the component by leveraging the extrinsic system call.

17. The method of claim 11, wherein supplementing the version of the OS comprises:
identifying a table that is installed on the computing device and includes a plurality of intrinsic system calls supported by the version of the OS; and
patching the table to accommodate the extrinsic system call based at least in part on the incoming package.

18. The method of claim 11, wherein supplementing the version of the OS comprises adding, to the computing device, a table that includes the extrinsic system call to enable the supplemented version of the OS to support execution of the upgraded component.

19. A non-transitory computer-readable medium comprising one or more computer-executable instructions that, when executed by at least one processing device, cause the processing device to:

detect an incoming package that facilitates upgrading at least one component associated with an operating system (OS) that is installed on a computing device and supports a plurality of intrinsic system calls accommodated in a table in kernel space;

identify a version of the OS installed on the computing device;

identify the component as being compatible with a different version of the OS based at least in part on the incoming package;

supplement the version of the OS to support at least one extrinsic system call available in the different version of the OS in response to determining that the component is compatible with the different version of the OS by:

allocating, in the kernel space, an extrinsic system call table that accommodates the extrinsic system call and is isolated from the table; or patching, in the kernel space, the table to accommodate the extrinsic system call in addition to the plurality of intrinsic system calls; and upgrade the component upon supplementing the version of the OS to support the extrinsic system call.

20. The apparatus of claim 1, wherein the extrinsic system call enables the component to:

communicate with the version of the OS; and interface with one or more hardware resources of a computing device via the version of the OS.

\* \* \* \* \*